United States Patent
Drescher et al.

(10) Patent No.: US 6,977,368 B2
(45) Date of Patent: Dec. 20, 2005

(54) METHOD FOR MEASURING POSITION AND POSITION MEASURING DEVICE FOR CARRYING OUT SAID METHOD

(75) Inventors: Jörg Drescher, Riedering (DE); Mathias Hausschmid, Palling (DE); Herbert Huber-Lenk, Nussdorf/Sondermoning (DE); Herbert Reiter, Garching/Alz (DE); Johann Streitwieser, Grabenstätt (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 135 days.

(21) Appl. No.: 10/415,626

(22) PCT Filed: Oct. 13, 2001

(86) PCT No.: PCT/EP01/11857

§ 371 (c)(1),
(2), (4) Date: Sep. 8, 2003

(87) PCT Pub. No.: WO02/37060

PCT Pub. Date: May 10, 2002

(65) Prior Publication Data

US 2004/0031913 A1    Feb. 19, 2004

(30) Foreign Application Priority Data

Oct. 31, 2000  (DE) ............................... 100 54 062

(51) Int. Cl.$^7$ ............................................. G01D 5/34
(52) U.S. Cl. ........................... 250/231.13; 250/231.14; 250/227.26; 356/616
(58) Field of Search ......... 250/231.13, 231.14–231.16, 250/231.17, 231.18, 227.11, 227.26, 237 G; 356/614, 616, 617; 341/11, 13, 14

(56) References Cited

U.S. PATENT DOCUMENTS

| | | | |
|---|---|---|---|
| 4,291,976 A | | 9/1981 | McMahon |
| 4,867,568 A | | 9/1989 | Heinz et al. |
| 4,906,837 A | | 3/1990 | Doneen et al. |
| 4,907,848 A | | 3/1990 | Pavlath |
| 4,931,635 A | * | 6/1990 | Toyama ..................... 250/225 |
| 4,931,771 A | | 6/1990 | Kahn |
| 5,038,031 A | * | 8/1991 | Kurosawa et al. ..... 250/231.14 |
| 5,073,711 A | | 12/1991 | Brininstool et al. |

(Continued)

FOREIGN PATENT DOCUMENTS

DE         37 11 958 A1      10/1988

(Continued)

OTHER PUBLICATIONS

Patent Abstracts of Japan document regarding Japanese patent publication 5-10785, published by the Japanese Patent Office, while the date of publication is unknown, it is believed that the Patent Abstracts of Japan document was published prior to Sep. 8, 2003, eight pages.

(Continued)

*Primary Examiner*—Kevin Pyo
(74) *Attorney, Agent, or Firm*—Brinks Hofer Gilson & Lione

(57) ABSTRACT

A position measuring system that includes a scale and a scanning device that scans the scale. A light source, which emits a light pulse upon receipt of a request signal and an optical fiber that transmits the light pulse from the light source to the scanning device and for illuminating the scale. At least one photo detector that detects the light pulse affected by the scale as a function of its position.

14 Claims, 2 Drawing Sheets

U.S. PATENT DOCUMENTS 5,116,123 A 5/1992 Kuderer
5,406,077 A 4/1995 Aoki et al.

FOREIGN PATENT DOCUMENTS

| DE | 44 10 955 A1 | 10/1994 |
| EP | 0 209 514 A2 | 1/1987 |
| EP | 0 399 057 A1 | 11/1990 |
| JP | 5-10785 A | 1/1993 |
| JP | 6-3165 A | 1/1994 |

OTHER PUBLICATIONS

Patent Abstracts of Japan document regarding Japanese patent publication 6-3165, published by the Japanese Patent Office, 1994, one page.

Yim-Bun Patrick Kwan et al., "Massarbeit Nanometergenaue Positionsmessung in allen Freiheitsgraden," F & M Messtechnik, vol. 108, 2000, pp. 60-64.

* cited by examiner

METHOD FOR MEASURING POSITION AND POSITION MEASURING DEVICE FOR CARRYING OUT SAID METHOD

Applicants claim, under 35 U.S.C. §§120 and 365, the benefit of priority of the filing date of Oct. 13, 2001 of a Patent Cooperation Treaty patent application, copy attached, Serial Number PCT/EP01/11857, filed on the aforementioned date, the entire contents of which are incorporated herein by reference, wherein Patent Cooperation Treaty patent application Serial Number PCT/EP01/11857 was not published under PCT Article 21(2) in English.

Applicants claim, under 35 U.S.C. §119, the benefit of priority of the filing date of Oct. 31, 2000 of a German patent application, copy attached, Serial Number 100 54 062.7, filed on the aforementioned date, the entire contents of which are incorporated herein by reference.

BACKGROUND OF THE INVENTION

Incremental or absolute position measuring systems are used for detecting the definite position of moved objects on machines, such as machine tools or wafer steppers, for example. In connection with this, the position measuring system must measure the position of the object at fixed definite times and inform the electronic control device which controls the movement sequence. The times are mostly defined by the electronic control device with the aid of trigger pulses. These trigger pulses are provided to the position measuring system, or to its electronic evaluation device, which then stores an internal count and triggers the A/D converters for signal interpolation by storing, or taking over, instantaneous values of the scanning signals with the same period, which are phase-shifted in respect to each other, and which are analog-digitally converted. At the end, the internal signal processing device in the electronic evaluation device outputs a measured position value which was not present exactly at the time of the triggering, but instead at a time which was displaced by the amount of storage time. Typical storage times are a few $\mu$s.

The continuously increasing displacement speeds, and the increased demands made on accuracy at the same time require, particularly at high speeds, increasingly shorter storing times, and above all an extremely small fluctuation of the storing time (storing jitter). The latter will be explained by the example of a wafer stepper, which was taken from an article by P. Kwan, U. Mickan, M. Hercher "Nanometergenaue Positionsmessung in allen Freiheitsgraden" (Position Measuring Accurate Down to a Nanometer in all Degrees of Freedom), F&M 108 (2000) 9, pp. 60 to 64. At a displacement speed of 2 m/s and a storing jitter of only 1 ns, the position uncertainty caused by this is already 2 nm, which represents a considerable loss of accuracy in connection with such applications. On the other hand, a storing jitter of less than 1 ns makes extremely high demands on the electronic evaluation device and the position measuring system. The following effects must be taken into account in connection with position measuring systems:

i) All analog amplifiers required for signal processing upstream of the A/D converter have limited bandwidths, and therefore delay the scanning signals to a considerable extent. Small amounts of drift of the components used because of the effects of temperature or aging affect the signal running times and therefore greatly contribute to storing jitter. Moreover, the signal running times are a function of the input frequency, and therefore the displacement speed, which can produce additional contributions to the storing jitter;

ii) The A/D converters also contribute to the storing jitter, because they do not measure the applied voltages exactly in relation to the switching flanks of the carrier pulses; and iii) As a rule, the scanning signals are phase-shifted by 90° in relation to each other. The sine signal, as well as the cosine signal, must have the same storing time, otherwise an effective storing time of the position measuring system which differs from the exact position is obtained, which fluctuates between the storing time of the sine signal and the cosine signal. Regarding the position determination within a signal period, the respective scanning signal located in the vicinity of its crossover is decisive, since it shows the greatest change in position, or phase relation, in this range.

A position measuring system is described in DE 44 10 955 A1, in which the light source is supplied with a strong current at the time an external trigger signal is present as a request signal. The disclosed synchronization of the light source with external trigger pulses is suited only for low demands made on the storing jitter, because the supply of the trigger pulses (request signal) to the light source located in the position measuring system takes place there by a wire connection from an external electronic tracking device (electronic control device). With customary cable lengths of 0.5 to 20 m, this does not assure a sufficient running time stability in the 10 ns range and below, and can therefore not be used in demanding applications. In this connection it should be noted that low-jitter trigger pulses are mostly available only directly at the electronic components which generate them.

SUMMARY AND OBJECTS OF THE INVENTION

It is therefore an object of the present invention to disclose a method for position measurement and a position measuring system for executing the method, which assure a precise position measurement.

This object is attained by a method for position determination that includes generating a light pulse upon receipt of a request signal and transmitting the light pulse through an optical fiber to a scale. The method further includes illuminating the scale with the light pulse, affecting the light pulse in a position-dependent manner by the scale and detecting the light pulse affected by the scale by at least one photo detector.

This object is also attained by a position measuring system that includes a scale and a scanning device that scans the scale. A light source, which emits a light pulse upon receipt of a request signal and an optical fiber that transmits the light pulse from the light source to the scanning device and for illuminating the scale. At least one photo detector that detects the light pulse affected by the scale as a function of its position.

Extremely small storing jitters can be achieved by the measures in accordance with the present invention.

The present invention will be explained in greater detail by exemplary embodiments.

Shown are in:

DESCRIPTION OF THE PREFERRED EMBODIMENT(S) OF THE INVENTION

Figure 1:
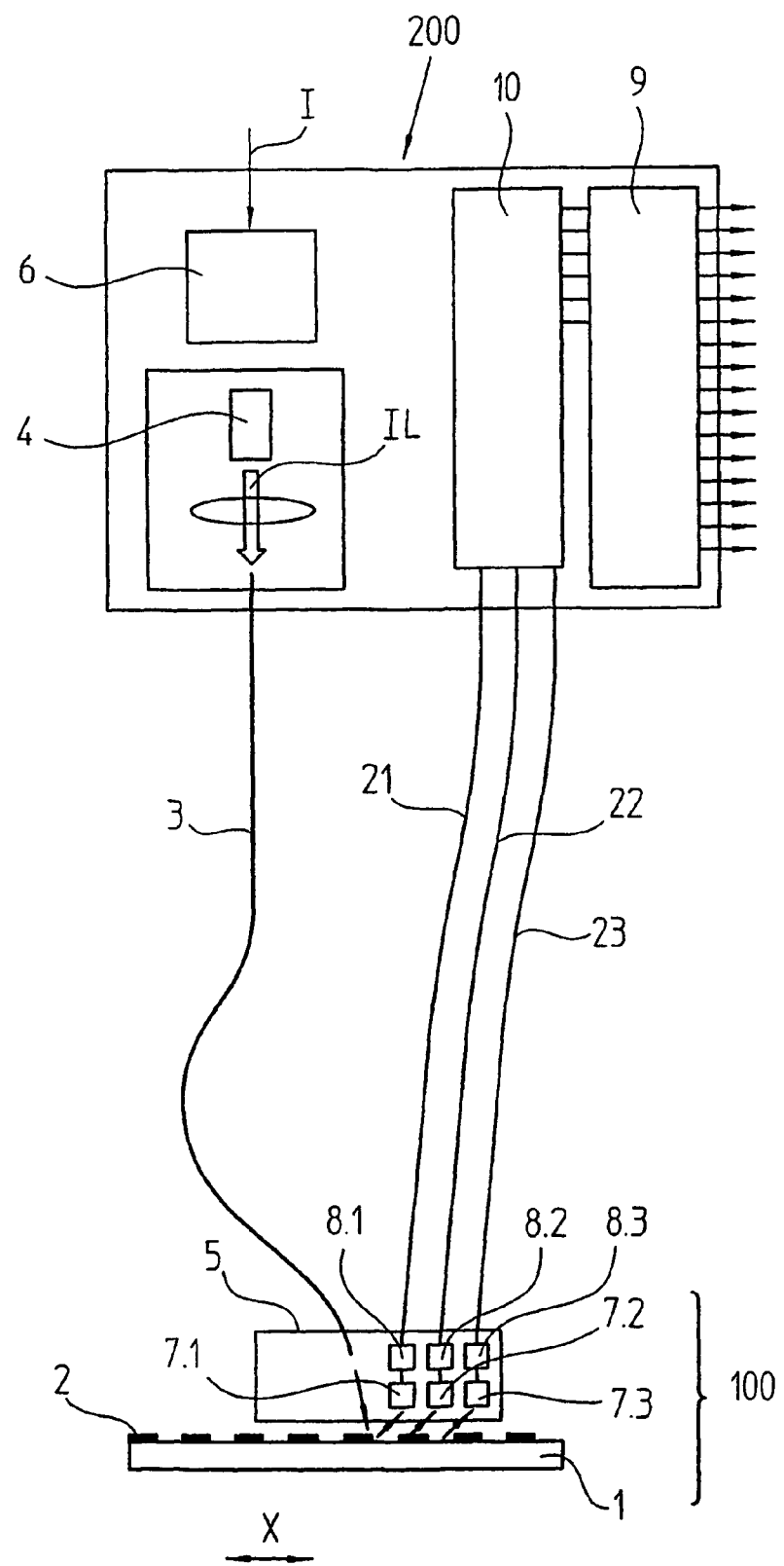
FIG. 1 schematically shows a first embodiment of a position measuring system in accordance with the present invention.

The position measuring system 100 in FIG. 1 includes a scale 1 with a graduation 2, which can be opto-electrically scanned and moved relative to a scanning device 5 in the measuring direction X. The graduation 2 can be embodied so that it can be scanned by transmitted light or by incident light. The scale 1 can furthermore be designed for incremental or absolute linear or angular measuring. The light required for illuminating the scale 1 is conducted through an optical fiber 3 to the position measuring system 100. The light source 4 of the optical position measuring system of the invention is not installed directly in the scanning device 5 and instead is located at the place where a low-jitter trigger pulse I—also called a request signal—is available, i.e. preferably in the vicinity of, or integrated into an electronic control device 200, which generates the trigger pulse I. The trigger pulse I is now transmitted via a digital, and therefore fast driver stage 6 to the light source 4, which therefore synchronously transmits a light pulse IL of a pulse length of 25 psec to 5 nsec. In the electronic control device 200, this light pulse IL is coupled into the optical fiber 3 and transmitted to the scanning device 5. In this case the running time of the light pulse IL in the optical fiber 3 is very constant, in particular if single-mode fibers are employed. However, very good results are also achieved with multi-mode graded index fibers. In the scanning device 5, the light pulses IL are directed by a suitable optical scanning device onto the scale 1, and finally to photodiodes 7.1, 7.2, 7.3. In this case it is irrelevant which optical scanning device is used. In particular, imaging, as well as interferential scanning methods are available. Photo-charges are now generated in the photodiodes 7.1, 7.2, 7.3 by the short light pulses IL, which are transmitted to downstream-connected charge amplifiers 8.1, 8.2, 8.3. The charge amplifiers 8.1, 8.2, 8.3 can be integrated either into the downstream-connected electronic evaluation device 9, or directly into the scanning device 5. It is advantageous if they are integrated into the scanning device 5, so that charge- amplified scanning signals are conducted through lines 21, 22, 23. At their outlets they provide signal voltages, which are converted into digital signals by analog-digital converters (A/DCs). The subsequent digital processing takes place in the same way as in customary position measuring systems in that within a period interpolation signals are determined from several scanning signals of the same period, which are phase-shifted by 120° or 90° with respect to each other. These processing methods are known and will not be further explained here. Immediately following the measurement, the charge capacitors of the charge amplifiers 8.1, 8.2, 8.3 are reset (discharged), so that the next measurement can be performed by sending a further light pulse IL to the scale 1. The short light pulse IL defines in an extremely exact manner the time of the position determination. The downstream-located electronic components—such as photodiodes 7.1, 7.2, 7.3, amplifiers, A/DCs 10, connecting cables, etc.—do not affect the result and can therefore be designed to be relatively slow, and therefore cost-effective.

Depending on the scanning method, laser diodes, VCSELs, LEDs, solid state lasers, superluminescence diodes, can be considered as light sources 4. In this case a further advantage of the present invention comes to the fore, particularly in connection with semiconductor lasers: because of the pulsing, the laser becomes longitudinally monomodal and can therefore no longer have interfering mode jumps. In connection with interferential position measuring systems 100, such mode jumps cause sudden and very interfering jumps in the indicated position already with slightly different optical path lengths of the interfering lightbeams.

For incremental scanning methods it is furthermore necessary to determine the number of the crossed signal periods. In contrast to position measuring systems in which the scale 1 is continuously illuminated, the realization of counters is here no longer directly possible, since no scanning signals are available between two trigger pulses I. It is therefore suggested to trigger the position measuring system 100 very frequently, adapted to signal period and the maximum speed, or acceleration, for example with 1 MHz. By this high trigger rate it is possible to calculate speeds which can hardly change from one trigger time to the next from the interpolated fine positions. At a slow speed a sufficient number of measured values is obtained in one signal period so that it is possible to unequivocally detect a jump to the next signal period, and a software period counter can therefore count up. If the speed is increased, successive measured values can be separated from each other up to a few signal periods, and a dependable count of the signal periods with the aid of the software period counter is possible in spite of this. To this end, the speed is approximately calculated from previous fine positions, and the occurring signal periods between two trigger times are determined from this. A high trigger rate is advantageous. If the trigger rate of the electronic control device 200 is too low, the electronic evaluation device 9 must intersperse additional trigger pulses I.

Figure 2:
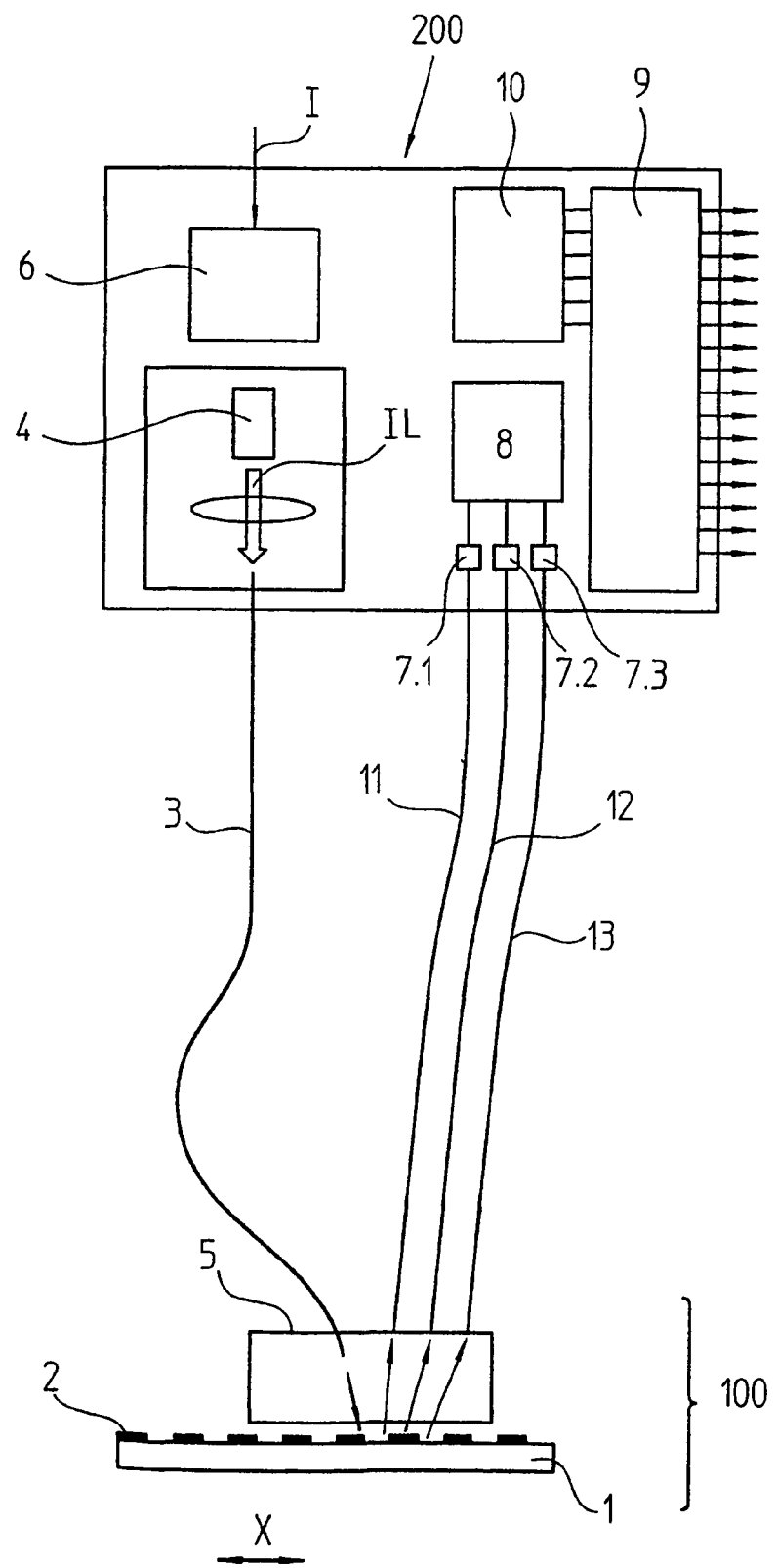
FIG. 2 schematically shows a second embodiment of a position measuring system in accordance with the present invention.

The exemplary embodiment in accordance with FIG. 2 differs from the first one by the use of multi-mode optical fibers 11, 12, 13, for the return of the light from the scanning light beams, which were modulated at the scale 1, to the electronic evaluation device 9. In this case the photodiodes 7.1, 7.2, 7.3 are contained in the electronic evaluation device 9 for receiving the light transmitted back by the optical fibers 11, 12, 13. In this way the scanning device 5 becomes passive, i.e. it is no longer connected by electrical cables and can therefore also be employed in critical environments (high tension, discharges, explosive gases) without interference. Thereby it is furthermore also possible to transmit signals of relatively high frequency in a simple way.

The light pulse IL from the light source 4 can be used for the simultaneous illumination of several scales, for example on several shafts of a machine. In this case the optical fibers in which the common light pulse IL is supplied to the individual scales should have at least approximately the same lengths.

The trigger pulse I is an electrical or optical pulse, by which sensors, and if required actuators, of a machine are simultaneously synchronized in an advantageous manner. Position measuring systems 100 with several shafts, distance sensors, acceleration sensors and speed sensors, i.e. sensors which are employed for control, are counted among the sensors. The trigger pulse I is synchronized with the control cycle of the control unit of the machine, for example a numerically controlled machine tool.

If the trigger pulse I already is an optical pulse, the elements identified by the reference numerals 4 and 6 in FIGS. 1 and 2 are superfluous, an optical processing unit in the form of an optical fiber amplifier, optical switch or optical mixer can be provided in their place.

The highly accurate position measurement in accordance with the present invention can be combined with a second position measurement. For example, constant light of a wavelength differing from the light pulse IL is transmitted through the optical fiber 3, and the graduation 2 and/or another graduation, or coding, is illuminated and scanned by this constant light. A rough position is then determined by scanning with the constant light, and this position is refined by the light pulse IL. In this case the rough position can be determined by a hardware counter, and the position determination by the light pulse IL takes place by means of a software counter, which provides the instantaneous position on the basis of interpolation values of the scanning signals, which are phase-shifted with respect to each other.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A position measuring system for position determination of a movable object of a machine, whose movement is controlled by a regulating unit, the system comprising:
   a scale;
   a scanning device that scans said scale;
   a light source, which emits a light pulse based on a request signal, which is generated by a regulating unit of a machine that has a movable object, said request signal is generated synchronously with a regulator cycle of said regulating unit;
   an optical fiber from said regulating unit to said scanning device that transmits said light pulse from said light source to said scanning device and for illuminating said scale; and
   at least one photo detector that detects said light pulse affected by said scale as a function of its position.

2. The position measuring system in accordance with claim 1, further comprising a second scale, wherein a second optical fiber transmits said light pulse so as to illuminate said second scale.

3. The position measuring system in accordance with claim 1, further comprising a charge amplifier connected downstream of said at least one photo detector.

4. The position measuring system in accordance with claim 3, wherein said at least one photo detector is arranged together with said charge amplifier in said scanning device.

5. The position measuring system in accordance with claim 1, wherein said at least one photo detector is arranged in an evaluation device, and said light pulse is affected in a position-dependent manner by said scale and is conducted via a second optical fiber to said at least one photo detector.

6. The position measuring system in accordance with claim 1, wherein said optical fiber comprises a single-mode fiber.

7. The position measuring system in accordance with claim 1, wherein said optical fiber comprises a multi-mode graded index fiber.

8. The position measuring system in accordance with claim 1, wherein said light source comprises a semiconductor laser.

9. The position measuring system in accordance with claim 1, wherein each of said at least one photo detectors receives a partial light beam of said light pulse affected by said scale.

10. A method for position determination of a movable object of a machine, the method comprising:
    generating a request signal by a regulating unit of a machine that controls movement of a movable object of said machine, said generating said request signal is performed synchronously with a regulator cycle of said regulating unit;
    generating a light pulse based on said request signal;
    transmitting said light pulse from said regulating unit through an optical fiber to a scale;
    illuminating said scale with said light pulse;
    affecting said light pulse in a position-dependent manner by said scale; and
    detecting said light pulse affected by said scale by at least one photo detector.

11. The method in accordance with claim 10, wherein said transmitting comprises transmitting said light pulse from said regulating unit through a second optical fiber to a second scale.

12. The method in accordance with claim 10, further comprising generating photo-charges in said at least one photo detector by said generated light pulses, which are transmitted to downstream-connected charge amplifiers.

13. The method in accordance with claim 12, further comprising resetting said charge amplifiers between said generated light pulse and a second generated light pulse generated after said generated light pulse.

14. The method in accordance with claim 10, wherein each of said at least one photo detectors receives a partial light beam of said light pulse affected by said scale.

* * * * *